United States Patent

[11] 3,604,979

| [72] | Inventors | Tetsuji Shimizu;<br>Ryozo Yagi; Susumu Usami; Shozo Naito,<br>all of Nagoya, Japan |
|---|---|---|
| [21] | Appl. No. | 679,390 |
| [22] | Filed | Oct. 31, 1967 |
| [45] | Patented | Sept. 14, 1971 |
| [73] | Assignee | Kabushiki Kaisha Tokai Rika Denki<br>Seisakusho<br>Aichi-Prefecture, Japan |
| [32] | Priority | July 22, 1967, Aug. 1, 1967 |
| [33] | | Japan |
| [31] | | 42/63595 and 42/66732 |

[54] SEQUENTIAL FLASHER
5 Claims, 2 Drawing Figs.

[52] U.S. Cl. ................................................. 315/317,
315/321, 307/293, 331/108 B, 340/82
[51] Int. Cl. ..................................................... H05b 39/09,
B60q 1/38
[50] Field of Search ............................................ 315/210,
317; 330/112; 340/82; 317/235, 41.1;
307/240–242, 254, 255, 293

[56] References Cited
UNITED STATES PATENTS

| 3,105,158 | 9/1963 | Nichols | 330/112 UX |
| 3,313,981 | 4/1967 | Kratochvil | 340/82 UX |
| 3,162,772 | 12/1964 | Smith | 307/293 X |
| 3,206,615 | 9/1965 | La Pointe | 317/235-41.1 UX |
| 3,427,512 | 2/1969 | Mapother | 317/235-41.1 UX |
| 3,456,131 | 7/1969 | Adem | 340/82 X |
| 3,474,410 | 10/1969 | Ivec | 340/82 |

OTHER REFERENCES

SCR Manual, 4th Edition, 1967 Semiconductor Products, Department, General Electric Company, Syracuse, N.Y. page 7.

*Primary Examiner*—John W. Caldwell
*Assistant Examiner*—Kenneth N. Leimer
*Attorney*—McGlew and Toren ABSTRACT: A sequential flasher, of the type used, for example, on automotive vehicles, includes a plurality of amplifier stages each including a pair of transistor amplifiers, a positive feedback circuit interconnecting the amplifiers, electric lamps serving as loads, and electronic time constant means, the feedback circuit in each stage being arranged in a cascade connection with the electronic time constant means. No mechanical switching elements are used. In one embodiment of the invention, each of the stages has a respective electric lamp, and a first switch is provided to connect the sequential flasher to one terminal of a source of potential, such as a battery, and a second switch is provided to connect the sequential flasher to the opposite terminal of the battery, with this second switch preferably being a cyclically operable switch.

In a second embodiment of the invention, the last stage does not have a respective electric lamp, and the second switch is omitted. The last stage has associated therewith a diode which, in conjunction with the electronic time constant means of the last stage, serves to repetitively initiate operation of the sequential flasher as long as the first switch is closed.

3,604,979

SEQUENTIAL FLASHER

BACKGROUND OF THE INVENTION

The present invention relates to a sequential flasher. A sequential flasher, so constructed that a plurality of lamps are lighted up in successive order and the thus lighted lamps are extinguished simultaneously, or in the same order as they were lighted up, has been recently adopted in automobiles as the means for indicating the turning or advancing direction of an automobile. The sequential flasher, which is attached to the rear part of a car body and used as the means for indicating the advancing or turning direction of the automobile is, in general, so constructed that a plurality of lamps are lighted up successively, towards the advancing or turning direction, and subsequently all the lighted lamps are extinguished.

Most switching mechanisms in the conventional type of sequential flashers have incorporated mechanical means, such as snap action switches operated in succession by means of cams of different configurations provided on the reduced-speed output shaft of a DC permanent magnetic-field-type motor.

The switching system in a sequential flasher of the present invention has a quite different constituting from that of the conventional system. That is, the switching system of the present invention is so constructed that a positive feedback circuit, wherein electric lamps are used as loads, is in a cascade connection with elements having a time constant.

The main object of the present invention, accordingly, is to provide a sequential flasher having a switching system wherein positive feedback circuit means, including electric lamps serving as loads, are in a cascade connection with elements having a time constant but requiring no mechanical operating elements.

BRIEF DESCRIPTION OF THE DRAWINGS

For an understanding of the principles of the invention, reference is made to the following description of typical embodiments thereof as disclosed in the accompanying drawings.

In the accompanying drawings showing preferred embodiments of the present invention.

Figure 1:
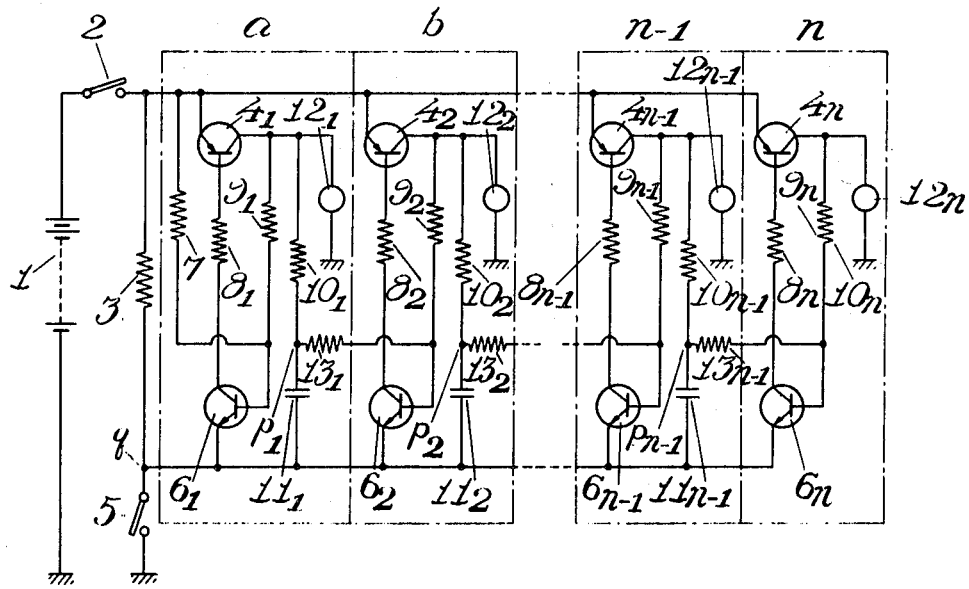
FIG. 1 shows a circuit diagram of a sequential flasher in accordance with the present invention.

In the sequential flasher illustrated in FIG. 1, the ungrounded terminal of a grounded battery 1 is connected through a switch 2 to serve as a potential source for respective emitters of transistors $4_1$, $4_2$-$4_{n11}$ and $4_n$ in respective stages $a$ through $n$. The ungrounded terminal of battery 1 is also connected, through switch 2, with a resistor 7 having an end connected to the base of transistor $6_1$ in the first stage $a$. Switch 2 is also connected through a resistor 3 with the emitters of transistors $6_1$, $6_2$ to $6_{n11}$ and $6_n$ of respective successive stages. The thus connected emitters of respective transistors $6_1$, $6_2$ to $6_{n11}$ and $6_n$ can be connected with the cathode of the battery 1 through a control switch 5 provided between ground and the emitter junction $q$ common to transistors $6_1$-$6_n$. In each stage $a$, $b$,-$n-1$ and $n$, the respective two transistors, $4_1$-$4_n$ and $6_1$-$6_n$ are arranged to constitute a positive feedback amplifier by connecting the bases of respective amplifiers $4_1$-$4_n$ with the collectors of respective amplifiers $6_1$-$6_n$ through respective resistors $8_1$, $8_2$ to $8_{n11}$ and $8_n$ and connecting the collectors of respective amplifiers $4_1$-$4_n$ with the bases of the respective amplifiers $6_1$-$6_n$ through respective resistors $9_1$, $9_2$ to $9_{n11}$ and $9_n$. The collectors of the transistors $4_1$, $4_2$ to $4_{n11}$ and $4_n$ are connected with the ungrounded terminal battery 1 through respective loads such as $12_1$, $12_2$ to $12_{n11}$ and $12_n$ in each stage, and the collectors of transistors $4_1$, $4_2$ to $4_{n11}$, excluding that of the final stage $n$ are connected, through respective resistors and condensers $10_1$ and $11_1$, $10_2$ and $11_2$ to $10_{n11}$ and $11_{n11}$, with the emitters of respective transistors $6_1$, $6_2$ to $6_{n11}$ excluding that of the final stage $n$. The respective junctions points $P_1$-$P_{n11}$ of resistors $10_1$-$10_{n11}$ and condensers $11_1$-$11_{n11}$ are connected with the bases of transistors $6_2$-$6_n$ of the respective succeeding stage.

The sequential flasher of the present invention, as shown in FIG. 1, operates as follows. When the switch 2 is closed as the control switch 5 is left open, condenser $11_1$ is charged through a circuit including resistor 3, condenser $11_1$, the resistor $10_1$ and lamp load $12_1$ in the first stage, and, in the same manner, condensers $11_2$ to $11_{n11}$ of respective stages are charged. At this time, the potential at the point $q$ is substantially equal to that of the emitters of transistors $4_1$, $4_2$ to $4_{n11}$ and $4_n$. Therefore no base current will flow in transistor $6_1$ in the first stage $a$ the same is true in the successive stages $b$-$n$.

When the control switch 5 is closed, potential at point $q$ drops to zero, and current flows through the resistor 7 into the base of the transistor $6_1$ of the first stage $a$. As a result, the base current of the transistor $4_1$ flows through the resistor $8_1$ into the collector of the transistor $6_1$, so that the potential of the collector is increased. Meanwhile, the base current of the transistor $6_1$ continually increases due to the current passing through the resistor $9_1$ so that the potential of the collector of the transistor $4_1$ continues to increase. By such a positive feedback operation, the transistor $4_1$ is brought into saturation, and the potential of the collector therefore rapidly becomes substantially equal to that of the ungrounded or positive terminal of the battery and is impressed on the load $12_1$, whereby the sequential flasher comes into operation. At this time, changing of condenser $11_1$ is started and, after a certain time interval, by the charge thus stored in the condenser 11, the potential of the connecting point $P_1$ is increased sufficiently to initiate flow of current into the base of the transistor $6_2$ in the second stage $b$. Thus, the positive feedback operation is also initiated in the second stage $b$ in the same manner as in the first stage $a$ and further initiated in to successive stages, by means of which lamp loads $12_2$ to $12_n$ in respective stages are energized in succession. The time interval between energization of the preceding load and energization of the succeeding load depends upon the setting time constant of the time constant circuit constituted by one of the resistors $10_1$ to $10_{n11}$, one of condensers $11_1$ to $11_{n11}$ and one of resistors $13_1$ to $13_{n11}$.

When the control switch 5 is opened after energization of the load $12_n$ in the final stage $n$, successive potential at $q$ has increased to a value substantially equal to that of the potential source, as in the initial condition. This interrupts the base currents of transistors $6_1$ to $6_n$ and the currents through transistors $4_1$ to $4_n$. Thus, deenergization of all loads $12_1$ to $12_n$ is effected simultaneously.

If the control switch 5 is so formed that it may be automatically opened and closed at a certain and appropriate interval, successive energization and simultaneous deenergization of loads $12_1$ to $12n$ can be automatically repeated. The control switch should be a nonarcing switch of semiconductor materials.

Figure 2:
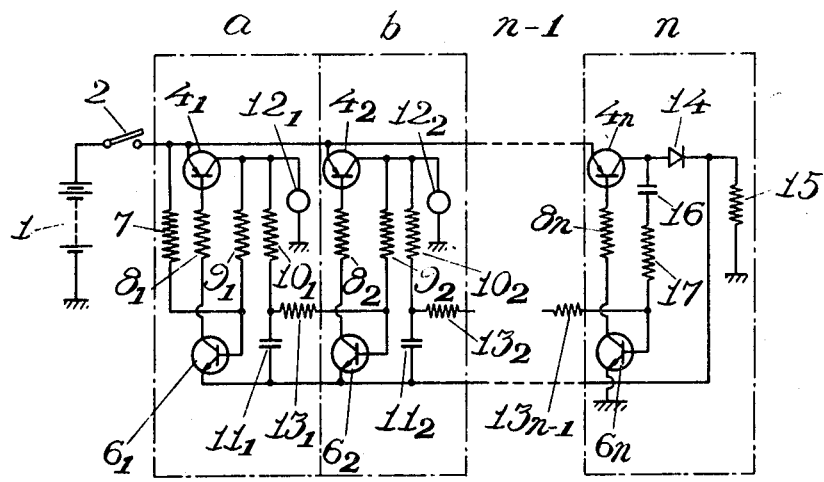
FIG. 2 shows a circuit diagram of a sequential flasher of another embodiment in accordance with the present invention.

In the alternative embodiment shown in FIG. 2, the major part of the wiring connections are the same as shown in FIG. 1, and the same reference numerals have been used, in FIG. 2, to designate parts corresponding to those of FIG. 1.

In FIG. 2, the ungrounded or positive terminal of a battery 1 is connected through a switch 2 with the emitters of transistors $4_1$, $4_2$ to $4_n$ disposed in respective stages $a$, $b$ to $n$, and the bases of these transistors are connected through respective resistors $8_1$, $8_2$ to $8_n$ with the collectors of respective transistors $6_1$, $6_2$ to $6_n$. The collectors of transistors $4_1$, $4_2$ to $4_{n11}$ of respective stages $a$, $b$ to $n-1$ excluding, the final stage $n$, are further connected through respective resistors $9_1$, $9_2$ to $9_{n11}$ with the bases of respective transistors $6_1$, $6_2$ to $6_{n11}$. The base of the transistor $6_1$ in the first stage $a$ is connected with the switch 2 through the resistor 7. The emitter of the transistor $6_1$ of the first stage $a$ is connected with the emitters of transistors $6_2$ to $6_{n11}$ of the succeeding stages $b$ to $n-1$. In the final stage $n$, a diode 14 is connected with the collector of the transistor $4_n$ with the reverse polarity, and further connected with the grounded terminal of the battery 1 through the resistor 15. The emitter of the transistor $6_n$ is also connected with the grounded terminal of the battery. The collectors of transistors $4_1$, $4_2$ to $4_{n11}$ of respective stages $a$, $b$ to $n-1$, excluding the final stage $n$, are connected with the grounded terminal of the battery 1 through the corresponding lamp loads $12_1$, $12_2$ to $12_{n11}$ of respective stages. These collectors are also respectively connected with the emitters of transistors $6_1$, $6_2$ to $6_{n11}$ through respective resistors $10_1$, $10_2$ to $10_{n11}$ and condensers $11_1$, $11_2$ to $11_{n11}$, and connected with the bases of transistors $6_2$ to $6_n$, disposed in the succeeding stages $b$ to $n$, through resistors $13_1$, $13_2$ to $13_{n11}$ leading from the junction points $P_1$, $P_2$ to $P_{n11}$ of resistors $10_1$, $10_2$ to $10_{n11}$ and the associated condensers $11_1$, $11_2$ to $11_{n11}$. Moreover, the collector of the transistor $4_n$ is connected with the base of the transistor $6_n$ through the condenser 16 and the resistor 17.

When the switch 2 is closed in the foregoing circuit, current flows into the grounded terminal of battery 1, through the resistor 7, the base and the emitter of the transistor $6_1$ and the transistor 15. Current flows to condenser 16 and the resistor 17 is blocked by the diode 14. In accordance with flow of base current of transistor $6_1$, the base current of transistor $4_1$ flows to increase the potential of the collector of transistor $6_1$, so that the base current of the transistor $6_1$ increases through the resistor $9_1$. By such positive feedback operation, the potential of the collector of the transistor $4_1$ is rapidly increased until it becomes equal to the voltage of the battery so as to energize load $12_1$. At this time, charging of the condenser $11_1$, through the resistor $10_1$, is started and an electric charge is accumulated therein, so that the potential of the junction point $P_1$, connecting the resistor $10_1$ with the condenser $11_1$, increases sufficiently to initiate flow of current to the transistor $6_2$ of the second amplification stage $b$ through the resistor $13_1$. Immediately upon flow of current in the transistor $6_2$, positive feedback similar to that in the preceding stage $a$ takes place to energize the load $12_2$ in the second stage $b$. In the same manner as done in the preceding stages loads in successive stages are energized in succession. Thus, current flows into the base of transistor $6_n$, through resistor $13_{n11}$, in the final stage $n$, and then the current flows through the base of transistor $4_n$ and flows through the resistor $8_n$ to increase the potential of the collector of transistor $6_n$. At this time, positive feedback takes place within the period determined by the condenser 16 and the resistor 17. The potential of the collector of transistor $4_n$ is increased rapidly to a value substantially equal to that of the battery. At the same time, the potentials of emitters of transistors $6_1$, $6_2$ to $6_{n11}$, as transistor $4_n$ is connected with these emitters through the normal direction of the diode 14, become substantially equal to those of the emitters of transistors $4_1$, $4_2$ to $4_{n11}$ which results in blocking flow of current through resistors $8_1$, $8_2$ to $8_{n11}$ and resistors $9_1$, $9_2$ to $9_{n11}$. Consequently, transistors $4_1$, $4_2$ to $4_{n11}$ and transistors $6_1$, $6_2$ to $6_{n11}$ are cut off and the energization of loads $12_1$, $12_2$ to $12_{n11}$ is simultaneously interrupted. After that, immediately upon termination of the positive feedback operation in the final stage $n$ the potential of the collector of the transistor $4_n$ again decreases to zero. By this, the current again flows through the resistor 7 into the base of the transistor $6_1$ in the first stage $a$, and the aforementioned operation is repeated.

In the sequential flasher of the present invention, which has the construction and interconnections described above, current is supplied to respective loads arranged in successive amplifier stages and at a desired time interval. The current supplied to the loads is then interrupted, simultaneously as to all of the loads, after the lapse of a certain time after all of the loads have been energized. This is one operational cycle of the circuit, which is repeated. Because of this, the circuit of the present invention is extremely advantageous for use as a directional signal of an automobile, guide directional lights of rolling stock, vessels and airplanes, switching circuits for light sources for advertising illuminations and sequential control circuits. The circuit of the present invention, in which a nonarcing system is adopted to the exclusion of any mechanical operation and whose size can be compactly designed, can bear advantageously resistance to vibrations and shock when it is imbedded in synthetic resinous materials having excellent heat radiation properties.

What is claimed is:

1. A sequential flasher comprising, in combination, a source of electric potential; plural sequentially arranged positive feedback amplifier stages connected to said source; respective electric lamp loads connected in at least all except the last of said amplifier stages, and energized by the respective amplifier stage, so that the lamp loads are energized in a preselected sequence; each amplifier stage including at least two solid state amplifier elements and positive feedback circuit means interconnecting said amplifier elements; a respective time constant circuit connected in at least each amplifier stage except the last, and connected to the next succeeding amplifier stage to control initiation of operation of the next succeeding amplifier stage; and means connecting the positive feedback circuit of the final stage to each of the preceding amplifier stages in controlling relation therewith to terminate operation of all of said amplifier stages after a predetermined time period of operation of said final amplifier stage.

2. A sequential flasher, as claimed in claim 1, in which said amplifier elements comprise, in each stage, first and second transistors interconnected by the respective positive feedback circuit means; a common emitter circuit interconnecting the emitters of the first transistors of at least all of said stages except the final stage; and control switch means selectively operable to connect said common emitter circuit and the base of the first transistor of the first stage across said source of electric potential to apply an emitter bias to each of said first transistors connected to said common emitter circuit and to apply a base bias to said first transistor of said first stage.

3. A sequential flasher, as claimed in claim 2, including a resistor connected in series between said control switch means and the base of said first transistor of said first stage.

4. A sequential flasher comprising, in combination, a source of electric potential; plural sequentially arranged positive feedback amplifier stages connected to said source; respective electric lamp loads connected in at least all except the last of said amplifier stages, and energized by the respective amplifier stage, so that the lamp loads are energized in a preselected sequence; each amplifier stage including at least two solid state amplifier elements and positive feedback circuit means interconnecting said amplifier elements; a respective time constant circuit connected in at least each amplifier stage except the last, and connected to the next succeeding amplifier stage to control initiation of operation of the next succeeding amplifier stage; said amplifier elements comprising, for each stage, first and second transistors; a respective time constant circuit connected in said last amplifier stage; a first common emitter circuit interconnecting the emitters of the first transistors of all of said stages; a second common emitter circuit interconnecting the emitters of the second transistors of all of said stages except said last stage; control switch means selectively operable to connect said first common emitter circuit and the base of the second transistor of the first stage to one terminal of said source of electric potential; the emitter of the second transistor of said last stage being connected to the other terminal of said source; and a diode connecting the time constant circuit of said last stage to said second common emitter circuit and operable, responsive to operation of the time constant circuit of said last stage, to apply an emitter cutoff potential to the emitters of the second transistors of all of the stages except the last stage.

5. A sequential flasher comprising, in combination, a source of electric potential; plural sequentially arranged positive feedback amplifier stages connected to said source; respective electric lamp loads connected in at least all except the last of said amplifier stages, and energized by the respective amplifier stage, so that the lamp loads are energized in a preselected sequence; each amplifier stage including at least two solid state amplifier elements and positive feedback circuit means interconnecting said amplifier elements; a respective time constant circuit connected in at least each amplifier stage except the last, and connected to the next succeeding amplifier stage to control initiation of operation of the next succeeding amplifier stage; said amplifier elements comprising, for each stage, first and second transistors interconnected by the respective feedback circuit means; a first common emitter circuit interconnecting the emitters of all of said first transistors; a second common emitter circuit interconnecting the emitters of all of said second transistors; a first control switch selectively operable to connect said first common emitter circuit to one terminal of said source of electrical potential; a second control switch selectively operative to connect said common emitter circuit to the other terminal of said source; a first resistance connecting said second common emitter circuit to said first control switch; and a second resistance connecting the base of the second transistor of the first stage to said first control switch.